United States Patent [19]

Müller

[11] Patent Number: 4,806,832
[45] Date of Patent: Feb. 21, 1989

[54] FAN WITH TEMPERATURE CONTROLLED ROTATION SPEED

[75] Inventor: Rolf Müller, St. Georgen, Fed. Rep. of Germany

[73] Assignee: Papst Motoren KG, St. Georgen, Fed. Rep. of Germany

[21] Appl. No.: 770,843

[22] Filed: Aug. 29, 1985

Related U.S. Application Data

[63] Continuation-in-part of Ser. No. 554,064, Nov. 21, 1983, abandoned.

[30] Foreign Application Priority Data

Nov. 23, 1982 [DE] Fed. Rep. of Germany ....... 3243163

[51] Int. Cl.$^4$ .............................................. G05B 5/00
[52] U.S. Cl. ..................................... 318/334; 361/27; 318/331; 318/471
[58] Field of Search ............... 318/334, 471, 472, 473, 318/331; 361/25, 27

[56] References Cited

U.S. PATENT DOCUMENTS

| | | | |
|---|---|---|---|
| 2,991,405 | 7/1961 | Carlson | 318/471 |
| 3,196,629 | 7/1965 | Wood | 318/471 X |
| 3,396,323 | 8/1968 | Auld | 318/334 X |
| 3,412,306 | 11/1968 | Fischer | 318/331 |
| 3,568,027 | 3/1971 | Bacon | 318/331 |
| 3,809,960 | 5/1974 | Jossie | 318/471 X |
| 4,093,899 | 6/1978 | Denny | 318/334 |
| 4,350,937 | 9/1982 | Miyazaki et al. | 318/331 |
| 4,356,438 | 10/1982 | Iwasaki | 318/334 X |
| 4,381,480 | 4/1983 | Harg et al. | 318/473 X |
| 4,475,071 | 10/1984 | Yoshizawa | 318/334 |
| 4,494,057 | 1/1985 | Hotta | 318/334 X |
| 4,506,199 | 3/1985 | Asche | 318/313 |
| 4,517,502 | 5/1985 | Aschoff et al. | 318/334 X |

Primary Examiner—Benjamin Dobeck
Attorney, Agent, or Firm—Horst M. Kasper

[57] ABSTRACT

The invention employs a stabilization circuit including a longitudinal branch with a series connection of a Zener diode and a resistor and in the other longitudinal branch with the series connection of a transistor and where the motor winding of the driving electric motor and the cross-branch is provided with a transistor and a corresponding series resistor. In the case of such an operating circuit without current control, the connection of the two modes of operation is advantageously achieved by operating a voltage divider, which comprises a series connection of a temperature dependent resistor element with a relatively small series resistor and a larger adjustable resistor, and in addition in each case again with a smaller series resistor, where this voltage divider influences directly the transistor which is connected in series with the winding. The combination of this temperature dependent circuit for controlling the rotation speed of the stabilization circuit in this simple manner results in a fully satisfying operational circuit.

41 Claims, 2 Drawing Sheets

FAN WITH TEMPERATURE CONTROLLED ROTATION SPEED

DESCRIPTION

CROSS-REFERENCE TO RELATED APPLICATIONS

This application is a continuation-in-part application of another application filed Nov. 21, 1983 and bearing Ser. No. 554,064 now abandoned. The entire disclosure of this latter application, including the drawings thereof, is hereby incorporated in this application as if fully set forth herein.

BACKGROUND OF THE INVENTION

1. Field of the Invention

The present invention relates to a fan with a direct current motor where the speed of the rotary blade is controlled depending on the ambient temperature.

2. Brief Description of the Background of the Invention Including Prior Art

A direct current fan with control means employing temperature as the sensed parameter for the control function is taught in U.S. Pat. No. 4,426,604 issued Jan. 17, 1984 entitled DIRECT CURRENT FAN WITH CONTROL MEANS. The circuit employs a sensor for sensing the speed of the motor, which is amplified in an amplifier and the resulting signal is then fed to an r.p.m. comparator. FIG. 2 discloses a positive temperature coefficient (PTC) resistor used to increase the speed upon increase in temperature. The PTC resistor is connected between one power input terminal and a series connection of two resistors and comparator terminals to the other power input. The comparator is connected to a sensor for the speed of the motor. This circuit is complicated by the use of two comparators, an amplifier and the speed control sensor and provides for a limitation of the size of the current fed to the windings of the motor.

U.S. Pat. No. 2,991,405 to Carlson teaches a transistorized motor control system. A thermistor 42 controls via transistors T2, T3 and T4 a motor 2. This circuit does not provide for any minimum stabilized voltage to be fed to the motor.

An electronic thermostat is taught in German Patent No. 2,331,022. A rectifying circuit is shown where the motor is switched between two rotation speeds and standstill.

A circuit for controlling the rotary speed of an electric motor driving a fan is taught in German Patent No. 2,845,437. Relays are provided for switching between the rotary speed in each case followed by on-off switches.

U.S. Pat. No. 4,286,198 to de Valroger teaches a direct current motor unit without commutator. This reference teaches the use of a protective means for a Darlington transistor, but no temperature control is provided at all. This reference also shows a bridge-circuit by numerals 41, 42, 51, 30, 40, 44.

A motor of the kind useful in the context of the present invention is shown in U.S. Pat. No. 4,030,005 by way of example. However, other D.C. motors known in the art can also be employed to be connected to the output power of the circuit of the present invention.

At present there is frequently a requirement associated with the ventilation or, respectively, cooling of electronic equipment for noise reasons that the fan provides the power in fact required for the cooling, that is the fan reduces its rotation speed in case of a lower power requirement in order to achieve a minimum noise development.

The solution of a similar problem is disclosed in German patent application No. P 3,024,613.0, where however, the direct current motor is connected to a control circuit for limiting the current.

In contrast, the present invention relates to a control of the rotation speed or, respectively, voltage of a fan or, respectively, of its immediately directly driving axial direct current motor with electronic commutation depending on the ambient temperature.

The operation of direct current motors with a voltage stabilization circuit at a direct current power grid is known. Furthermore, it is of concern to obtain the mentioned functional dependence on the ambient temperature and in particular under special boundary conditions.

The boundary conditions can be preset from the outside arbitrarily or by outer circumstances. They can also become necessary by a special kind of driving motor, or by a special kind of its operating circuit. For example an operating circuit for a D.C. motor is set forth in German Patent Application Laid Open DE-OS No. 2,419,432, where based on a capacitance a so-called block protection is achieved, that is the motor does not accept any current in a braked or retarded state. Such a block protection by a capacitance however, in certain circumstances effects a voltage change occurring too slowly in connection with a temperature change or in cases, where the voltage rises very slowly starting from values too low, the start-up of a motor with such temperature control is prevented. The problem exists also with other block protection based on electrodynamic action, for example in case of such a block protection where decoupled voltage values are decoupled by rotation of the rotor magnet via diode elements. It may be desirable to allow the fan voltage according to FIG. 2 or its rotation speed to change linearly via the temperature, for example proportional to the natural zero degree point in centigrade as is shown approximately in FIG. 2. If then the rotation speed is lowered by cooling and correspondingly the operating voltage is lowered to small values, and then a slow temperature increase or, respectively, a voltage increase from too small values starts again, then under certain circumstances the fan would not run up any longer corresponding to the characteristic curve branch A of FIG. 2, since the voltage change du/dt would change too slowly of the fan motor protected by the capacitance block therefore, here a minimum voltage of 16 volts is fixed corresponding to a rotation speed of 2000 rotations per minute, which is independent of temperature, that is which is constant and which is represented by the characteristic curve branch B and this characteristic curve branch B is now to be realized. However, if the temperature increases beyond the characteristic curve intersection point of the branches A and B, or if a voltage higher than corresponding to this intersection point is applied, then the circuit is to operate automatically according to branch A.

SUMMARY OF THE INVENTION

1. Purposes of the Invention

It is an object of the invention to provide an electronic control circuit where the rotation speed of an electronically commuted direct current motor is varied within certain limits depending on the temperature of a temperature sensor, where a lower minimum rotation speed is to be fixed in order to achieve a safe starting of the motor even at low temperatures. This means that a simple operational circuit is to be produced within the framework of the problems and discussions set forth above, which in addition to providing a preferably linear dependence of the fan speed, which in particular can be a dependence of the fan rotation speed proportional to the natural centigrade temperature scale, is limited in its functioning such that the rotation speed does not fall below this minimum rotation speed, even in case of a corresponding cooling down of the ambient temperature.

These and other objects and advantages of the present invention will become evident from the description which follows.

2. Brief Description of the Invention

The object is achieved according to the invention by employing voltage stabilization measures and controlled voltage adjustment means and in particular means controlled by temperature where the respective upper or lower resulting power or voltage value of the two measures is fed to a D.C. motor. The operating power input of the motor is determined by a control of the voltage applied to the motor by the circuit stabilizing the operating power and by the circuit controlling the operating power.

A stabilization circuit is provided in a longitudinal branch with a series connection of a Zener diode and a resistor and in the other longitudinal branch with the series connection of a transistor (preferably furnished as a so-called Darlington transistor) and where the motor winding of the driving electric motor and the cross-branch is provided with a transistor and a corresponding series resistor. In case of such an operating circuit without current control the connection of the two modes of operation is advantageously achieved by operating a voltage divider, which comprises a series connection of a temperature dependent resistor element with a relatively small series resistor and a larger adjustable resistor, and, in addition, in each case again with a smaller series resistor, where this voltage divider influences directly the transistor, which is connected in series with the winding. The combination of this temperature dependent circuit for controlling the rotation speed of the previously recited and mentioned stabilization circuit in this simple manner results in a fully satisfying operational circuit.

According to a further embodiment additionally a relatively large resistor is provided in parallel to the base/collector line of the longitudinal transistor, which resistor operates as a negative feedback and functions as a stabilizing factor.

The invention further comprises employing logical connection means which together with a comparison voltage effects that the higher one of the stabilizing motor voltage and of the temperature dependent voltage becomes effective at the motor.

The invention is useful for fans with a dynamically blocked rotor control. Such motors need certain conditions for starting. They need a minimum voltage to have a sufficient starting torque. The invention provides in a simple way such a condition in a temperature controlled circuit of a motor. The function is noiseless, because the energy is spent in an analog manner.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
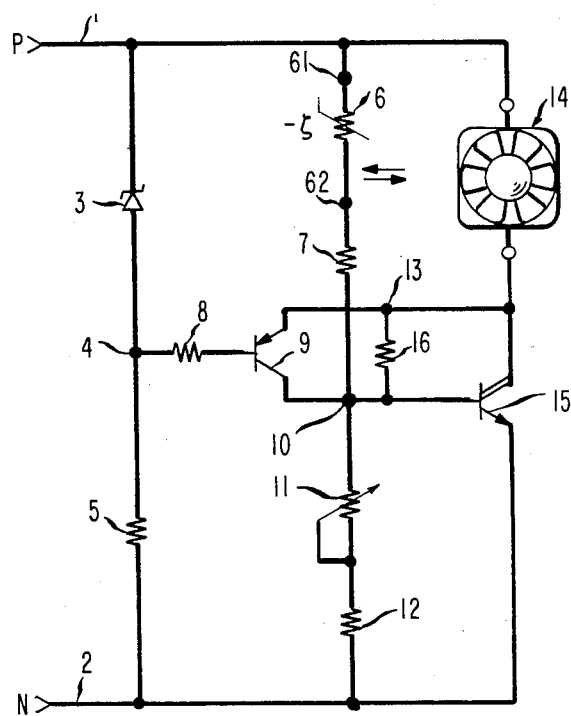
FIG. 1 is a view of a schematic circuit diagram of an embodiment of the present invention.

The embodiment of the invention according to FIG. 1 was initially intended for an operating direct current voltage $U_{PN}$ of 24 volt with a voltage range of from 18 to 30 volt. However, the circuit is also suitable for other operation voltages such as for example 48 volt or 5 volt. The circuit comprises two parallel acting branches comprising the elements 3, 5, 8, and 9; or, respectively, 6, 7, 11, and 12. The series connection of a Zener diode, having a limiting value of 18 volt, and a resistor 5, which is provided with a certain value about double the standard reference value. The standard reference value of a resistor in a circuit according to the invention is from about 0.1 to 10 Kilo-Ohm and preferably about 1 Kilo-Ohm. Another longitudinal branch of a bridge-circuit is disposed parallel, with circuit is furnished by the series connection of a driving motor 14, at which the limiting voltages 17 or 29 volts are applied, and of a transistor 15, which is for example provided as a Darlington transistor. Said bridge-circuit may be defined by four terminals with two parallel branches, each branch having two elements serially connected and one cross-branch connected between each said serial-elements. The ohmic resistance of the winding of the motor 14 has to limit the current in the transistor 15 under certain circumstances in case of an overvoltage. A line runs from the base of the transistor 15 to a reference point 10 of the base/emitter voltage divider and from there to the transistor 9. A series resistor 8 is connected to the input of the transistor 9, which runs at the other end of the series resistor 8 to the middle of the voltage divider of the left longitudinal resistor. The transistor 9 is important in the context of the present invention. It experiences a diode effect, which allows for providing the larger power value determined based on stabilization and on temperature sensing in each case to the motor.

The cross-branch is also provided with a parallel resistor 16 to the transistor 9 in addition to the resistor 8 and the parallel resistor 16 is disposed between the base and the center of the right half of the bridge and it acts stabilizing as a negative feedback. The voltage divider 6, 7, 11, and 12 with its reference point 10 influences immediately the base of the transistor 15 disposed in a series connection relative to the motor 14. The negative temperature coefficient NTC-resistor 6 together with the resistors 11 and 12 is also a voltage divider (where a relatively small series resistor 7 has less weight) and effects with its potential reference point 10 and thereby determines the temperature dependence. The function of the element 6 thus determines directly the branch A of the characteristic curve in FIG. 2, and this branch can be shifted parallel by changing of the resistor 11. The characteristic branch does not necessarily have to be parallel, but at least an approximate linearity is advantageous. The base emitter voltage determines the temperature dependence via the NTC-resistor 6 and in connection with the resistor 11 connected in series thereto, while the Zener diode 3 with its limiting voltage with certainty effects the minimum rotation speed of the fan according to the characteristic line branch B.

The resistor 7 is disposed in series to the NTC-resistor 6, the resistance of which can amount to about 1 Kilo-Ohm at 24 volt nominal voltage for an operating region of from 18 to 30 volt. The size of resistance of resistor 6 is assumed to be one relative standard unit in the context of the present application. Resistor 7 protects, acting as a series resistor on the input 15, this Darlington transistor 6 from overloading. The resistor 12 makes the adjustment of resistor 11 more comfortable, easy and accurate. Thus the series resistor 8 provided with a resistance of about 5 relative standard units protects the input of the transistor 9. The parallel resistor 16, which acts as a negative feedback, amounts to about 200 relative standard units. If the battery voltage varies between 18 and 30 volt, then the voltage at the motor varies between 17 and 29 volt.

A comparison between the motor voltage $U_{14}$ and the voltage at the Zener diode 3 ($U_3$) is effected by the transistor 9.

The speed change proper dependent on temperature is effected by the branch, which comprises a voltage divider with the elements 6, 7, 11 and 12 and which comprises the negative temperature coefficient NTC resistor 6. The temperature of the resistor element 6 decreases with increasing temperature such that the potential of the connection point 10 is increased. If this potential reaches the level required for the control of the transistor 15, then this transistor becomes conducting and allows a more or less large collector current to flow through the load 14, which load is preferably an electronically commuted direct current motor of a fan.

The temperature dependent voltage divider described would generate at sufficiently low temperature such a low output current at the transistor 15 that the preferably electronically commuted direct current motor of the fan would not be assured to start, if the device would be switched on at this low temperature, since the electronic commutation circuit requires a certain minimum voltage for its functioning.

In order to allow this minimum voltage, a second circuit branch is provided. It comprises a Zener diode 3, the resistors 5 and 8 and an auxiliary transistor 9. This branch operates together with the transistor 15 (final stage transistor or, respectively, power transistor) as a voltage controller in a way known in principle. The transistor 9 operates as a comparison element, which compares the potentials between its emitter and its base, that is the voltage at the Zener diode 3 is compared with the voltage at the load 14. As soon as the voltage along the "load" (motor 14) becomes about 0.6 volts less than the voltage at the Zener diode, the transistor 9 and thus also the transistor 15 become conducting and a further lowering of the voltage at the load 14 is prevented. This achieves the desired limitation of the load voltage to a certain lower limiting value.

The elements 3, 5, 8, 9, 14, 15 in FIG. 1 represent a comparator circuit which comprises a first branch with a voltage stabilization diode 3 and a resistor 5 and a second branch including the motor 14 and the transistor 15 and a comparison member, that is a branch between the two first recited branches comprising a series dropping resistor 8 and a transistor 9. The transistor 9 provides essentially a comparison in the basis emitter configuration between the potential at the junction point 4 of the first branch and the potential at the lower point 13 of the motor 14. The transistor 9 becomes conductive if the potential at the point 4 is lower by at least the forward voltage of the basis emitter configuration of the transistor 9. The transistor 9 assures that this voltage difference does not become larger by supplying a base current to the power transistor 15 and thus allows feeding more current power to the winding of the motor 14.

Thus a logical connection means is provided which, together with a comparison voltage, effects that the higher of either the stabilizing motor voltage as provided between points 1 and 4 in FIG. 1 or the temperature dependent voltage becomes effective at the motor winding.

Figure 2:
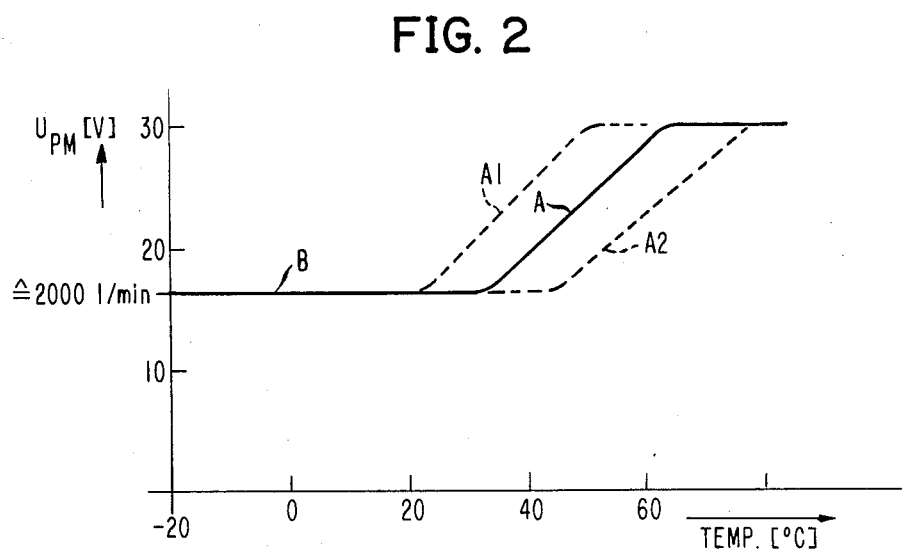
FIG. 2 is a view of a plot of the motor voltage versus the ambient temperature.

According to a further feature of the invention idea, a trimmer resistor 11 can be provided to aid in setting the temperature limit of the element 6 from which the fan is to experience an increase of its rotation speed. FIG. 1 shows the current layout of a preferred embodiment of the invention. FIG. 2 shows the typical course of the load voltage as a function of the temperature at the negative temperature coefficient NTC-resistor 6.

The diagram (FIG. 2) shows the mode of operation of the circuit described above. The Zener diode 3 prevents the rotation speed of the fan motor from decreasing under the voltage of the characteristic line branch B (here for example 16 volts, equivalent to about 2000 rotations per minute of the fan motor) upon cooling. The effect of the negative temperature coefficient NTC-resistor 6 is illustrated by the characteristic curve branch A, where this branch can be shifted as desired by adjustment of the adjustable resistor 11 such as shown with dashed lines as branches A1 or A2.

The invention effect of the circuit is also achieved if a positive temperature coefficient PTC-resistor 106 is disposed in parallel to the base-emitter connection of the transistor 15 and if at the same time a simple resistor 112 is employed in the base collector connection.

The temperature dependent resistor elements 6 or, respectively, 106 of FIGS. 1 or, respectively, 3 can be led outward at the points 61, 62 or, respectively, 63, 64 via extension sensor lines.

The use of the positive temperature coefficient PTC-resistor 106 in parallel to the base-emitter connection of the transistor 15 for the voltage division results in the advantage versus the embodiment of FIG. 1 that in case of interruption of the sensor line the motor continues to run, since the motor current is then not interrupted.

Figure 3:
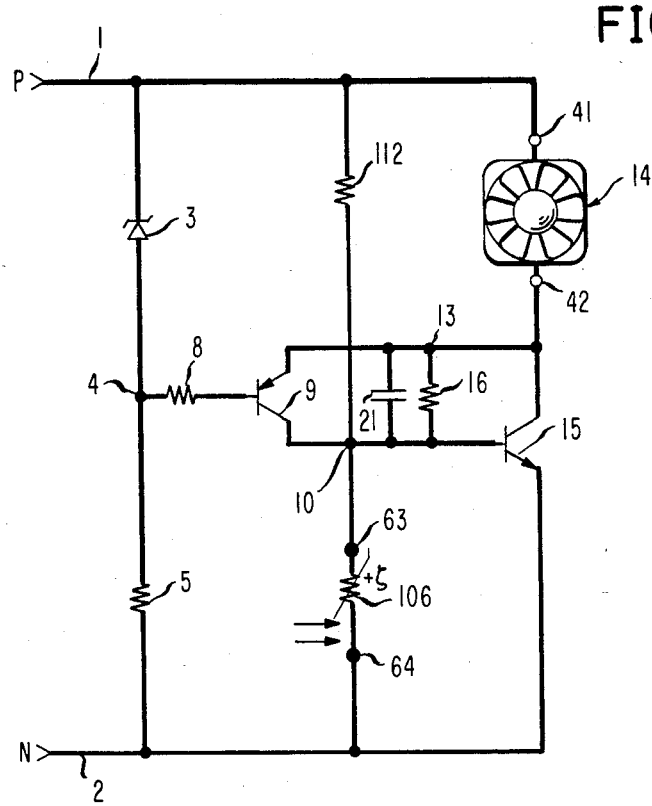
FIG. 3 is a view of a schematic circuit diagram of a second embodiment of the present invention employing a positive temperature coefficient resistor.

A capacitor 21 is disposed in parallel to the resistor 16 according to FIG. 3 and the capacitor 21 damps substantially H.F.-oscillations in the circuit.

Figure 4:
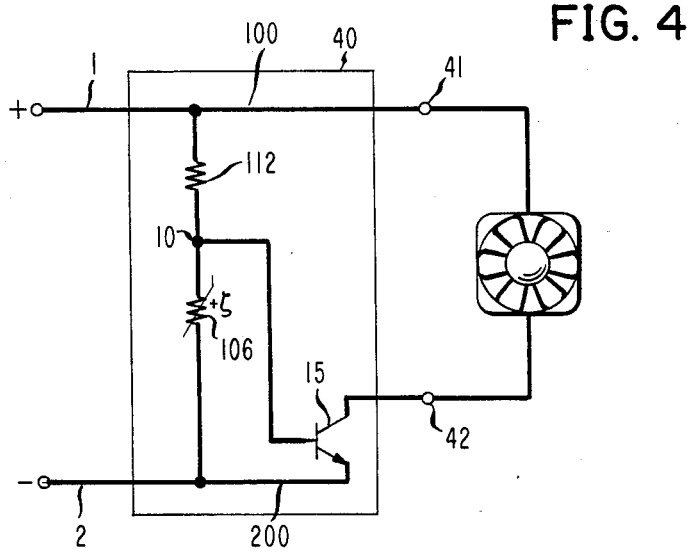
FIG. 4 is a view of a simplified version of the circuit shown in the diagram of FIG. 3.

FIG. 4 shows a simplified variant of FIG. 3. A surrounding line represented as "black box 40" comprises only the elements 112, 106 and 15, which are described above. The "black box 40" has two inputs 1, 2 via which the current is fed in and which are led to the two output points 41, 42 via lines 100, 200 and the output points 41, 42 are connected to the fan 14.

The relative standard unit value of the resistor 7 can be from about the value required to limit the maximum base current of transistor 15 to 0.1 of the resistance of the temperature coefficient resistor 6.

The maximum base current can be about from 0.01 to 0.5 milliampere for a Darlington transistor 15 and up to about 10 milliampere for a regular transistor substituting the Darlington transistor 15.

The voltage of the motor can be from about 5 to 100 Volts and is preferably from about 10 to 50 volts.

The resistor 16 providing counter coupling can be supplemented by other elements such as a capacitor. The resistor 16 can be from about 50 to 500 relative standard resistance units and is preferably from about 100 to 300 standard resistance units. Preferably, the resistor 15 is supplemented by a capacitor having a capacitance of from about 0.2 to 10 nF and preferably from about 0.5 to 5 nF. The capacitor serves to substantially reduce H.F.-oscillations.

The negative temperature coefficient resistor 6 employed according to FIG. 1 can be substituted by a circuit employing a positive temperature coefficient resistor. FIG. 3 shows a diagram employing such a positive temperature coefficient resistor 106. The positive temperature coefficient resistor is disposed in the other branch of the voltage divider section such as to provide the same direction of change of the voltage at the intermediate point as would result from the negative temperature coefficient resistor 6. Preferably, in case of employing a positive temperature coefficient resistor the negative temperature coefficient resistor is replaced by a simple resistor 112 or by a potentiometer.

It will be understood that each of the elements described above, or two or more together, may also find a useful application in other types of system configurations and fan speed control procedures differing from the types described above.

While the invention has been illustrated and described as embodied in the context of a fan with temperature controlled rotation speed, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A circuit for controlling the speed of a D.C. electric motor comprising
   a direct current voltage supply;
   a first electrical power input terminal of a motor power control circuit to be connected to the direct current voltage supply;
   a second electrical power input terminal of the motor power control circuit to be connected to the direct current voltage supply;
   a D.C. motor having a winding;
   a first electrical output terminal of the motor power control circuit to be connected to an input of the D.C. electric motor;
   a second electrical output terminal of the motor power control circuit to be connected to an input of the D.C. electric motor;
   a first connection line connecting the first electrical input terminal to the first electrical output terminal;
   a analog controllable amplifying means controlled by a bias voltage and connected to and disposed between the second electrical input terminal and the second electrical output terminal;
   a voltage divider circuit disposed between the first electric input terminal and the second electrical input terminal and comprising two branches wherein a temperature sensitive element is disposed in one branch causing a voltage drop depending on temperature and wherein a resistive element is disposed in the other branch and where an intermediate point of the two branches is connected to the analog controllable amplifying means for providing a voltage;
   a comparator connected to the motor for comparing the voltage drop of the motor with a preset voltage drop.

2. The circuit for controlling the speed of a D.C. electric motor according to claim 1 further comprising means for limiting a voltage provided between the first electrical output terminal and the second electrical output terminal to be higher than a predetermined lower level.

3. The circuit for controlling the speed of a D.C. electric motor according to claim 1 further comprising
   a switch maintaining current in the winding if the voltage drop along the DC motor is smaller than a preset voltage.

4. The circuit for controlling the speed of a D.C. electric motor according to claim 3 wherein the preset voltage drop is provided by a Zener diode.

5. The circuit for controlling the speed of a D.C. electric motor according to claim 3 wherein the switch is provided by a transistor.

6. The circuit for controlling the speed of a D.C. electric motor according to claim 1 further comprising
   a continuously operating switching element having an output connection, wherein the intermediate point is connected to the continuously operating switching element at its output connection via an electric damping element.

7. The circuit for controlling the speed of a D.C. electric motor according to claim 1 wherein the intermediate point connected to the analog controllable amplifying means provides a bias voltage.

8. The circuit for controlling the speed of a D.C. electric motor according to claim 1 further comprising
   wherein the analog controllable amplifying means includes an analog separating element for assuring a stabilized power to be supplied to the motor and wherein the intermediate point is connected to the analog separating element at its output connection via a capacitor.

9. The circuit for controlling the operation of a D.C. electric device according to claim 8 further comprising
   a resistor forming an electric damping element wherein the resistor connected at a first end to the intermediate point and at a second end to the second electrical output terminal.

10. The circuit for controlling the operation of a D.C. electric device according to claim 9 further comprising a resistor forming an electric damping element wherein the resistor is connected in parallel to said capacitor.

11. The circuit for controlling the operation of a D.C. device according to claim 9 wherein the resistor is provided by a potentiometer.

12. The circuit for controlling the speed of a D.C. electric motor according to claim 1 wherein the temperature sensitive element is a negative temperature coefficient resistor.

13. The circuit for controlling the speed of a D.C. electric motor according to claim 1 wherein the temperature sensitive element is a positive temperature coefficient resistor.

14. The circuit for controlling the speed of a D.C. electric motor according to claim 1 wherein the analog controllable amplifying means includes a transistor with the collector and emitter connected in series with the electric motor.

15. The circuit for controlling the operation of a D.C. electric device according to claim 1 further comprising
a transistor connecting the intermediate point to the second electrical output terminal and having its base connected to the second electrical input terminal via a resistor means.

16. A method for controlling the speed of an electric motor comprising
providing electric power with a D.C. power supply;
subjecting a first longitudinal branch to a voltage provided by the D.C. power supply, where the first longitudinal branch includes in a series connection the elements of a voltage limiting device (3), and a resistor (5);
subjecting a second longitudinal branch to voltage provided by the D.C. power supply, wherein the second longitudinal branch includes in a series connection of a transistor (15) and of a D.C. motor (14) to be driven;
comparing a voltage drop at a voltage limiting element (3) with the voltage drop at the motor (14) in an analog comparison stage (9), wherein the analog comparison stage (9) is included in a cross-branch and where the first longitudinal branch and the second longitudinal branch and the cross-branch form a stabilization circuit resembling a letter H;
dividing voltage provided by the D.C. power supply in a third longitudinal branch with a series connection of a temperature dependent resistor elements (6, 106) and at least one ohmic resistance (12, 112) acting directly on the transistor (15).

17. The method for controlling the speed of an electric motor according to claim 16 clamping the divided voltage with a voltage-limiting device (3) to a value sufficient to prevent falling of the motor speed to a preset value.

18. The method for controlling the speed of an electric motor according to claim 17 wherein the divided voltage is clamped with a Zener diode furnishing the voltage-limiting device.

19. The method for controlling the speed of an electric motor according to claim 16 wherein the analog comparison stage includes a transistor and wherein the voltage supplied to the motor is clamped to a value from about 50 to 80 percent of the power supply voltage.

20. A circuit for the temperature dependent control of the rotary speed of an electric motor, in particular of an electronically commuted direct current motor, wherein the improvement comprises
a direct current voltage source;
a voltage stabilizing element (3);
a resistor (5);
a transistor (15);
a D.C. motor;
an ohmic resistor (12);
a temperature dependent resistance element (6.106);
where a direct current is applied to a series connection of the voltage stabilized element (Zener diode 3) and of the resistor (5) in a longitudinal branch, to which operating voltage from the direct current source is applied, and where the direct current is applied to a series connection of the transistor (15) and of the D.C. motor to be driven in another longitudinal branch, and where the direct current is applied to a cross branch with a transistor (9) and a voltage divider of a series connection of a temperature dependent resistance element (6, 106), and of at least one ohmic resistor (12, 112) as a third longitudinal branch, which third longitudinal branch is controlling a longitudinal transistor (15), which is connected in series relative to the motor winding, where a reference point (10) of the voltage divider is connected to the base of the transistor (15).

21. Circuit according to claim 20 characterized in that a relatively large resistor (16) is provided in parallel to a base/emitter pair of the longitudinal transistor (15).

22. Circuit according to claim 21 characterized in that the temperature dependent resistor is provided by a series connection of a negative temperature coefficient resistor (6) and a resistor (7), which temperature dependent resistor is disposed between a reference point (10) and an input of the electric motor (14), which input is connected to the supply line.

23. Circuit according to claim 21 characterized in that the temperature dependent resistor is a positive temperature coefficient PTC resistor (106), which is disposed between a reference point (10) and the collector of the transistor (15).

24. Circuit according to claim 21 characterized in that the electric motor is provided with a block protection acting via a capacitor current or via a voltage occurring at an inductivity.

25. A circuit for controlling the speed of a D.C. electric motor comprising
electrical power input terminals to be connected to a D.C. power supply;
electrical output terminals to be connected to an input of a D.C. electric motor;
a first connection line connecting a pole of the power supply input terminal to an electrical output terminal;
a circuit for stabilizing an operating power input of the motor employing a diode by furnishing a stabilized power;
a temperature sensing element;
a circuit controlling the operating power input of the motor and generating depending on a temperature signal from the temperature sensing element an operating power, where the circuits are connected such that the larger of stabilized power and operating power is provided to the motor at any time.

26. The circuit for controlling the speed of a D.C. electric motor according to claim 25 wherein the operating power of the motor is determined by a control of a voltage applied to the motor by the circuit stabilizing the operating power and by the circuit controlling the operating power.

27. The circuit for controlling the speed of a D.C. electric motor according to claim 26 further comprising logical connection means which together with a comparison voltage effect that the higher one of the stabilized power and of the temperature dependent operating power becomes effective at the motor.

28. The circuit for controlling the speed of a D.C. electric motor according to claim 1 further comprising
means for limiting a lower level of a stabilized power provided between the first electrical output terminal and the second electrical output terminal;
a switch maintaining current in the D.C. motor if a voltage drop along the DC motor is smaller than a present voltage drop, wherein the present voltage drop is provided by a Zener diode;
a continuously operating switching element, wherein the intermediate point is connected to the continuously operating element at its output connection via an electric damping element and wherein the electric damping element is a resistor;
an analog separating element having an output and included in the analog controllable amplifying means, wherein the intermediate point is connected to the analog separating element at its output via a capacitor;
wherein the temperature sensitive element is a negative or a positive temperature coefficient resistor;
the continuous switching element is a transistor with the collector and emitter connected in series with the electric motor;
wherein the analog controllable amplifying means includes a transistor with the collector and emitter connected in series with the electric motor;
a transistor connecting the intermediate point to a second output and having its base connected to the second input via a resistor means.

29. A circuit for controlling the speed of an electric motor depending on temperature comprising a stabilization circuit formed like a letter H with a first and a second longitudinal branch and with a cross-branch, wherein the first longitudinal branch is subjected to line voltage and includes in a series connection the elements of a voltage limiting device (3), and a resistor (5) and where in the second longitudinal branch includes in a series connection of a transistor (15) and of a D.C. motor (14) to be driven and where the cross-branch includes an analog comparison stage (9), where the comparison stage (9) compares a voltage drop at a voltage limiting element (3) with the voltage drop at the motor (14) and where a voltage divider is employed as a third longitudinal branch including a series connection of a temperature dependent resistor element (6, 106) and at least one ohmic resistance (12, 112) acting directly on the transistor (15).

30. The circuit for controlling the speed of an electric motor depending on temperature according to claim 29 wherein the D.C. motor is electronically commutated, where the voltage limiting device is a Zener diode and where a reference point (10) of the circuit for controlling speed disposed at the point of series connection of the temperature dependent resistor element (6, 106) and of the ohmic resistance (12, 112) is connected to the base of the transistor (15).

31. The circuit for controlling the speed of an electric motor depending on temperature according to claim 29 wherein the ohmic resistance (12, 112) directly biases the base of the transistor (15).

32. A circuit for controlling the operation of a D.C. electric device comprising
a direct current voltage supply;
a first electrical power input terminal of a motor power control circuit to be connected to the direct current voltage supply;
a second electrical power input terminal of the motor power control circuit to be connected to the direct current voltage supply;
a D.C. electric device having an impedance;
a first electrical output terminal of the motor power control circuit to be connected to an input of the D.C. electric device;
a second electrical output terminal of the motor power control circuit to be connected to an input of the D.C. electric device;
a first connection line connecting the first electrical input terminal to the first electrical output terminal;
an analog controllable amplifying means controlled by a bias voltage and connected to and disposed between the second electrical input terminal and the second electrical output terminal;
a voltage divider circuit disposed between the first electric input terminal and the second electrical input terminal and comprising two branches wherein a temperature sensitive element is disposed in one branch causing a voltage drop depending on temperature and wherein a resistive element is disposed in the other branch and where an intermediate point of the two branches is connected to the analog controllable amplifying means for providing a voltage;
a comparator connected to the electric device for comparing the voltage drop of the electric device with a preset voltage drop.

33. The circuit for controlling the operation of a D.C. electric device according to claim 32 further comprising
means for limiting a voltage provided between the first electrical output terminal and the second electrical output terminal to be higher than a predetermined lower level.

34. The circuit for controlling the operation of a D.C. electric device according to claim 32 further comprising a switch maintaining current in the electric device if the voltage drop along the electric device is smaller than a present voltage.

35. The circuit for controlling the operation of a D.C. electric device according to claim 34 wherein the switch is provided by a transistor.

36. The circuit for controlling the operation of a D.C. electric device according to claim 32 further comprising
a continuously operating switching element having an output connection, wherein the intermediate point is connected to the continuously operating switching element at its output connection via an electric damping element.

37. The circuit for controlling the operation of a D.C. electric device according to claim 32 wherein the analog controllable amplifying means includes an analog separating element for assuring a minimum voltage to be supplied to the motor and wherein the intermediate point is connected to the analog separating element at its output connection via a capacitor.

38. The circuit for controlling the operation of a D.C. electric device according to claim 37 further comprising
a resistor forming an electric damping element wherein the resistor is connected in parallel to said capacitor.

39. The circuit for controlling the operation of a D.C. electric device according to claim 32 wherein the analog controllable amplifying means includes a transistor with the collector and emitter connected in series with the electric motor.

40. The circuit for controlling the operation of a D.C. electric device according to claim 32 further comprising
a transistor connecting the intermediate point to the second electrical output terminal and having its base connected to the second electrical input terminal via a resistor means.

41. The circuit for controlling the operation of a D.C. electric device according to claim 32 wherein the temperature sensitive element is a resistor with a temperature dependent resistance.

* * * * *